(12) United States Patent
Jacob et al.

(10) Patent No.: US 7,502,915 B2
(45) Date of Patent: Mar. 10, 2009

(54) SYSTEM AND METHOD USING EMBEDDED MICROPROCESSOR AS A NODE IN AN ADAPTABLE COMPUTING MACHINE

(75) Inventors: Rojit Jacob, San Jose, CA (US); Dan Minglun Chuang, San Diego, CA (US)

(73) Assignee: NVIDIA Corporation, Santa Clara, CA (US)

( * ) Notice: Subject to any disclaimer, the term of this patent is extended or adjusted under 35 U.S.C. 154(b) by 272 days.

(21) Appl. No.: 10/673,678

(22) Filed: Sep. 29, 2003

(65) Prior Publication Data

US 2004/0143724 A1 Jul. 22, 2004

Related U.S. Application Data

(60) Provisional application No. 60/415,320, filed on Sep. 30, 2002.

(51) Int. Cl.
*G06F 9/00* (2006.01)
(52) U.S. Cl. .......................................... 712/220; 712/16
(58) Field of Classification Search .................. 712/37, 712/16, 20, 21, 22; 326/37–50
See application file for complete search history.

(56) References Cited

U.S. PATENT DOCUMENTS

| | | | |
|---|---|---|---|
| 5,165,023 A * | 11/1992 | Gifford | 710/317 |
| 5,450,557 A | 9/1995 | Kopp et al. | |
| 5,475,856 A * | 12/1995 | Kogge | 712/20 |
| 5,646,544 A | 7/1997 | Iadanza | |
| 5,646,545 A * | 7/1997 | Trimberger et al. | 326/38 |
| 5,737,631 A | 4/1998 | Trimberger | |
| 5,828,858 A | 10/1998 | Athanas et al. | |
| 5,889,816 A | 3/1999 | Agrawal et al. | |
| 5,892,961 A | 4/1999 | Trimberger | |
| 5,907,580 A | 5/1999 | Cummings | |
| 5,910,733 A | 6/1999 | Bertolet et al. | |
| 5,943,242 A | 8/1999 | Vorbach et al. | |
| 5,959,881 A | 9/1999 | Trimberger et al. | |
| 5,963,048 A | 10/1999 | Harrison et al. | |
| 5,966,534 A | 10/1999 | Cooke et al. | |
| 5,970,254 A | 10/1999 | Cooke et al. | |
| 6,021,490 A | 2/2000 | Vorbach et al. | |
| 6,023,742 A | 2/2000 | Ebeling et al. | |
| 6,081,903 A | 6/2000 | Vorbach et al. | |
| 6,088,043 A | 7/2000 | Kelleher et al. | |
| 6,094,065 A | 7/2000 | Tavana et al. | |

(Continued)

OTHER PUBLICATIONS

Free On-Line Dictionary of Computing. © 1995-2000 www.foldoc.org search terms: cache, operating system, Internet, DMA, interrupt.*

*Primary Examiner*—Aimee J Li
(74) *Attorney, Agent, or Firm*—Patterson & Sheridan, LLP

(57) ABSTRACT

The present invention provides an adaptive computing engine (ACE) that includes processing nodes having different capabilities such as arithmetic nodes, bit-manipulation nodes, finite state machine nodes, input/output nodes and a programmable scalar node (PSN). In accordance with one embodiment of the present invention, a common architecture is adaptable to function in either a kernel node, or k-node, or as general purpose RISC node. The k-node acts as a system controller responsible for adapting other nodes to perform selected functions. As a RISC node, the PSN is configured to perform computationally intensive applications such as signal processing.

16 Claims, 8 Drawing Sheets

U.S. PATENT DOCUMENTS

| | | | |
|---|---|---|---|
| 6,119,181 A | 9/2000 | Vorbach et al. | |
| 6,120,551 A | 9/2000 | Law et al. | |
| 6,150,838 A | 11/2000 | Wittig et al. | |
| 6,173,389 B1 * | 1/2001 | Pechanek et al. | 712/24 |
| 6,230,307 B1 | 5/2001 | Davis et al. | |
| 6,237,029 B1 | 5/2001 | Master et al. | |
| 6,266,760 B1 | 7/2001 | DeHon et al. | |
| 6,272,616 B1 * | 8/2001 | Fernando et al. | 712/20 |
| 6,282,627 B1 | 8/2001 | Wong et al. | |
| 6,326,806 B1 * | 12/2001 | Fallside et al. | 326/38 |
| 6,338,106 B1 | 1/2002 | Vorbach et al. | |
| 6,353,841 B1 | 3/2002 | Marshall et al. | |
| 6,405,299 B1 | 6/2002 | Vorbach et al. | |
| 6,408,039 B1 | 6/2002 | Ito | |
| 6,425,068 B1 | 7/2002 | Vorbach et al. | |
| 6,433,578 B1 | 8/2002 | Wasson | |
| 6,480,937 B1 | 11/2002 | Vorbach et al. | |
| 6,542,998 B1 | 4/2003 | Vorbach et al. | |
| 6,571,381 B1 | 5/2003 | Vorbach et al. | |
| 6,697,979 B1 | 2/2004 | Vorbach et al. | |
| 7,003,660 B2 | 2/2006 | Vorbach et al. | |
| 7,210,129 B2 | 4/2007 | May et al. | |
| 7,266,725 B2 | 9/2007 | Vorbach et al. | |
| 7,394,284 B2 | 7/2008 | Vorbach | |
| 7,434,191 B2 | 10/2008 | Vorbach et al. | |
| 7,444,531 B2 | 10/2008 | Vorbach et al. | |
| 2002/0133688 A1 * | 9/2002 | Lee et al. | 712/22 |
| 2002/0138716 A1 * | 9/2002 | Master et al. | 712/227 |

* cited by examiner

| Data Memory Map | |
|---|---|
| | -- 0x0000 0000 |
| Node Memory | |
| | -- 0x0000 4000 |
| Reserved | |
| | -- 0x0000 8000 |
| ROM | |
| | -- 0x0000 A000 |
| Reserved | |
| | -- 0x0000 C000 |
| Secure Ram | |
| | -- 0x0000 CAC0 |
| Reserved | |
| | -- 0x0001 8000 |
| Node Registers | |
| | -- 0x0001 9000 |
| Reserved | |
| | -- 0x0040 0000 |
| Input/Output Buffer Access | |
| | -- 0x0060 0000 |
| Forward/Backward Acknowledgement | |
| | -- 0x0070 0000 |
| Own Node Wrapper Access | |
| | -- 0x0070 4000 |
| Reserved | |
| | -- 0x0200 0000 : 0x0000 0000 (K-Node addr : XMC addr) |
| External Instruction Memory Overlay | |
| | -- 0x0400 0000 : 0x0200 0000 (K-Node addr : XMC addr) |
| Reserved | |
| | -- 0x1000 0000 : 0x0000 0000 (K-Node addr : XMC addr) |
| External Data Memory | |
| | -- 0x2000 0000 : 0x1000 0000 (K-Node addr : XMC addr) |
| Reserved | |
| | -- 0x4000 0000 : 0x0000 0000 (K-Node addr : XMC addr) |
| Chip 0 External Data Memory | |
| | -- 0x5000 0000 : 0x0000 0000 (K-Node addr : XMC addr) |
| Chip 1 External Data Memory | |
| | -- 0x6000 0000 : 0x0000 0000 (K-Node addr : XMC addr) |
| Chip 2 External Data Memory | |
| | -- 0x7000 0000 : 0x0000 0000 (K-Node addr : XMC addr) |
| Chip 3 External Data Memory | |
| | -- 0x8000 0000 : 0x1000 0000 (K-Node addr : XMC addr) |
| ACM Chip and Node Access (Details in Figure 2) | |
| | -- 0x8340 0000 |
| Reserved | |
| | -- 0xffff ffff |

| Instruction Memory Map | |
|---|---|
| | -- 0x000 0000 |
| Reserved | -- 0x0000 0008 |
| Node Memory | |
| | -- 0x000 4000 |
| Reserved | |
| | -- 0x000 8000 |
| ROM | |
| | -- 0x000 A000 |
| Reserved | |
| | -- 0x200 0000 |
| External Instruction Memory Overlay | : 0x0000 0000 |
| | -- 0x3ff ffff |
| | : 0x01ff ffff |

Note: External Instruction Memory Overlay and External Data Memory have the same memory locations within external memory.

Figure 5A

Data Access

| | |
|---|---|
| nodal memory space | — 0x0000_0000 |
| | — 0x0000_4000 |
| PSN registers | — 0x1_3000 |
| | — 0x1_9000 |
| Input/output buffer access | — 0x40_0000 |
| Forward/backward ack | — 0x60_0000 |
| Self node node wrapper | — 0x70_0000 |
| | — 0x70_4000 |
| External memory overlay | — 0x200_0000 : 0x0000 0000 (K-Node addr : XHC addr) |
| | — 0x400_0000 : 0x0100 0000 (K-Node addr : XHC addr) |
| External memory | — 0x1000_0000 : 0x0000 0000 (K-Node addr : XHC addr) |
| | — 0x2000_0000 : 0x1000 0000 (K-Node addr : XHC addr) |
| | — 0x4000_0000 : 0x0000 0000 (K-Node addr : XHC addr) |
| External memory 0 (mra) | — 0x5000_0000 : 0x0000 0000 (K-Node addr : XHC addr) |
| External memory 1 (mra) | — 0x6000_0000 : 0x0000 0000 (K-Node addr : XHC addr) |
| External memory 2 (mra) | — 0x7000_0000 : 0x0000 0000 (K-Node addr : XHC addr) |
| External memory 3 (mra) | — 0x8000_0000 : 0x1000 0000 (K-Node addr : XHC addr) |
| | — 0xffff_ffff |

Instruction Access

| | |
|---|---|
| nodal memory space | — 0x000_0000 |
| | — 0x000_4000 |
| | |
| External memory | — 0x200_0000 : 0x0000 0000 |
| | — 0xfff_ffff : 0x01ff ffff |

Figure 5B

SYSTEM AND METHOD USING EMBEDDED MICROPROCESSOR AS A NODE IN AN ADAPTABLE COMPUTING MACHINE

CROSS-REFERENCES TO RELATED APPLICATIONS

This application claims priority to U.S. Provisional No. 60/415,320 filed Sep. 30, 2002, which is incorporated by reference herein.

This application is also related to commonly assigned patent application entitled "Adaptive Integrated Circuitry with Heterogeneous and Reconfigurable Matrices of Diverse and Adaptive Computational Units Having Fixed, Application Specific Computational Elements" by Gene Hogenauer et al., application Ser. No. 09/815,122, filed Mar. 22, 2001.

BACKGROUND OF THE INVENTION

1. Field of the Invention

Embodiments of the present invention relate to digital processing architectures. More particularly, embodiments of the present invention relate to the design and operation of a programmable scalar node in an adaptive computing engine.

2. Description of the Background Art

Many different types of integrated circuit technology are employed to achieve optimal cost versus performance characteristics in electronic devices. For example, application specific integrated circuits (ASICs) and field programmable gate array (FPGAs) are two types of integrated circuit technology that are widely employed to implement a variety of electronic functions.

ASICs and FPGAs are preferred for many integrated circuit applications because of the ability to reduce the design cycle and quickly produce new or different functions. ASICs may be customized by merely generating masks for one or more metal interconnect layers, which reduces the manufacturing process by several weeks. FPGAs may be customized in the field by programming fusible links to connect logic elements to achieve the desired functions.

While widely used, ASICs and FPGAs suffer from well-known drawbacks and limitations. For example, both technologies generally are slower, require larger die and are less power efficient than dedicated or custom integrated circuits. Notwithstanding the drawbacks and limitations, ASICs and FPGAs are often used in portable or battery-powered digital devices because the product life cycle is usually very short. Thus, it is impracticable to design custom or dedicated integrated circuits.

Many digital devices, such as cellular telephones, personal digital assistants (PDAs), notebook computers and other battery-powered devices, require several low power integrated circuits so the device can perform a variety of functions. For example, there is a need for a cellular telephone that can perform communication functions, high-speed data transmission, location awareness, true handwriting, speech and visual recognition, as well as other functions such as calendaring, word processing, accessing the Internet and responding to electronic mail (e-mail), digital photography. It is also desirable that other functions that have historically been performed by PDAs or notebook computers rather than a cellular telephone be provided in a small portable power efficient package. Clearly, to achieve all of these functions in a small package, there is a great need to minimize the number of integrated circuits required to perform these functions in order to reduce the size and weight of the digital devices and to improve power efficiency.

It is therefore desirable to provide an integrated circuit that can be adapted to perform one of several different functions. There is also a great need for a mobile communication device, such as cellular phone that interface with multiple communication worldwide standards so that users can roam throughout the world while staying "connected" via a single mobile device that also provides the features to call, page, email, and connect to the Internet.

SUMMARY OF EMBODIMENTS OF THE INVENTION

In accordance with one embodiment of the present invention, an adaptive computing engine (ACE) comprises a microprocessor based node that may be adapted to function either as a kernel node, or k-node, or as general purpose RISC node, or programmable scalar node (PSN).

Embodiments of the present invention also further provide a method for configuring the PSN to operate as either a k-node or as a RISC node.

The adaptable engine is generally operated as part of a multi-functional device such as a cellular phone, a camera, global positioning system, fax machine, or video conferencing system by way of example. The engine enables a user to access a plurality of functions such as communication, high-speed data transmission, location awareness, true handwriting, speech and visual recognition, calendaring, word processing, accessing the Internet and responding to electronic mail (e-mail), digital photography and many other functions in a single device.

In accordance with the present invention, the engine changes from one function to another "on-the-fly" by downloading executable computer code that includes hardware descriptions and instructions for performing a selected function. The computer code is downloadable from the Internet, other wireless or wired communication network or storage device, at any time, and anywhere in the world. In this manner, the user need not carry several devices, each dedicated to a desired function but rather may carry a single multi-function device.

The ACE's architecture has inherent system adaptability in which selected algorithms are directly mapped to dynamic hardware resources, resulting in the efficient use of hardware in terms of cost and size, with corresponding high performance and low power consumption. Thus, there is no need to provide an integrated circuit that is dedicated to a particular function such as cellular communication and another integrated circuit that is dedicated to digital photography as the ACE may be adapted to perform either function.

The ACE includes a plurality of processing nodes such as arithmetic nodes, bit-manipulation nodes, finite state machine nodes, input/output nodes and a programmable scalar node (PSN). The PSN, in accordance with embodiments of the present invention, has an embedded microprocessor circuit that may be adapted to function in either as a controller node, which is also referred to as a kernel node or a k-node, or as general purpose RISC node.

The k-node executes operating system instructions and manages operation of the ACE. The k-node is used to adapt other nodes to perform a function in much the same way that a subroutine may be called in a software program to perform a particular function. Further, the k-node, manages data flow between other nodes.

When operating as a RISC node, the PSN may be used for intensive applications requiring large code space. Thus, the PSN may be adapted to perform digital signal processing (DSP) functions at one point in time and then adapted to process digital photographic images. As used herein, RISC refers to a reduced instruction set computer.

As will be appreciated, the selection of PSN node type, the number of nodes, interconnection of nodes and other characteristics, determine the ultimate processing ability of the ACE, or other processing system using the nodes. Advantageously, the ACE is adapted in real time.

In one embodiment, an integrated circuit is provided. The integrated circuit comprises: a plurality of computational elements including a plurality of arithmetic nodes, a plurality of bit-manipulation nodes, a plurality of finite state machine nodes, and a plurality of input/output nodes; a first and a second processing node each having a core processor based on a common architecture, wherein the common architecture is reconfigurable to be a control node configured to control the interconnecting of said computational elements and a programmable scalar node (PSN) configured to perform computational applications; a first memory associated with said first processing node; a second memory associated with said second processing node; a first node wrapper for coupling said core processor of said first processing node to said first memory and to said computational elements; a second node wrapper for coupling said core processor of said second processing node to said second memory and to said computational elements; and means for interconnecting said computational elements and said first and second processing nodes to define a selected task to achieve a desired functionality, wherein the first processing node is configured as the control node based on a first configuration command, and the second processing node is configured as the PSN node based on a second configuration command.

In one embodiment, an adaptive computing engine is provided. The adaptive computing engine comprises: a first node having: a core processor reconfigurable into a controller node and a RISC processor, the controller node configured to execute operating system code and the RISC processor configured to execute application code; a memory for storing operating system executable code; means for transferring operating system executable code and data from said memory to said core processor, wherein the first node is configured as the controller node by a first configuration signal; a plurality of computational elements adapted to perform a selected function at least one of said computational elements having: a second node having: a core processor reconfigurable into a controller node and a RISC processor, the controller node configured to execute operating system code and the RISC processor configured to execute application code; a memory for storing application code; means for transferring application code and data from said memory to said second processor, wherein the second node is configured as the RISC processorby a second configuration signal; and a temporal interconnecting matrix coupling said controller node to said plurality of computational elements to perform a user selected function.

BRIEF DESCRIPTION OF THE DRAWINGS

FIGS. 5A and 5B illustrate representative partial memory maps for a k-node and a PSN, respectively, in accordance with an embodiment of the present invention.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

The present invention provides an adaptive computing engine (ACE) based on digital integrated circuit technology (IC). The ACE's architecture has inherent system adaptability in which selected algorithms are directly mapped to dynamic hardware resources, resulting in the efficient use of hardware in terms of cost and size, with corresponding high performance and low power consumption. Central to the adaptability of the ACE is a programmable node that can function as either a controller node, or k-node, that controls the operation of the ACE under control of an operating system or as a programmable scalar node (PSN) computing node. In one embodiment, the k-node and the PSN are broadly similar in architecture in that both have an embedded microprocessor logic block, but the two nodes are adapted to perform very different system functions.

Figure 1:
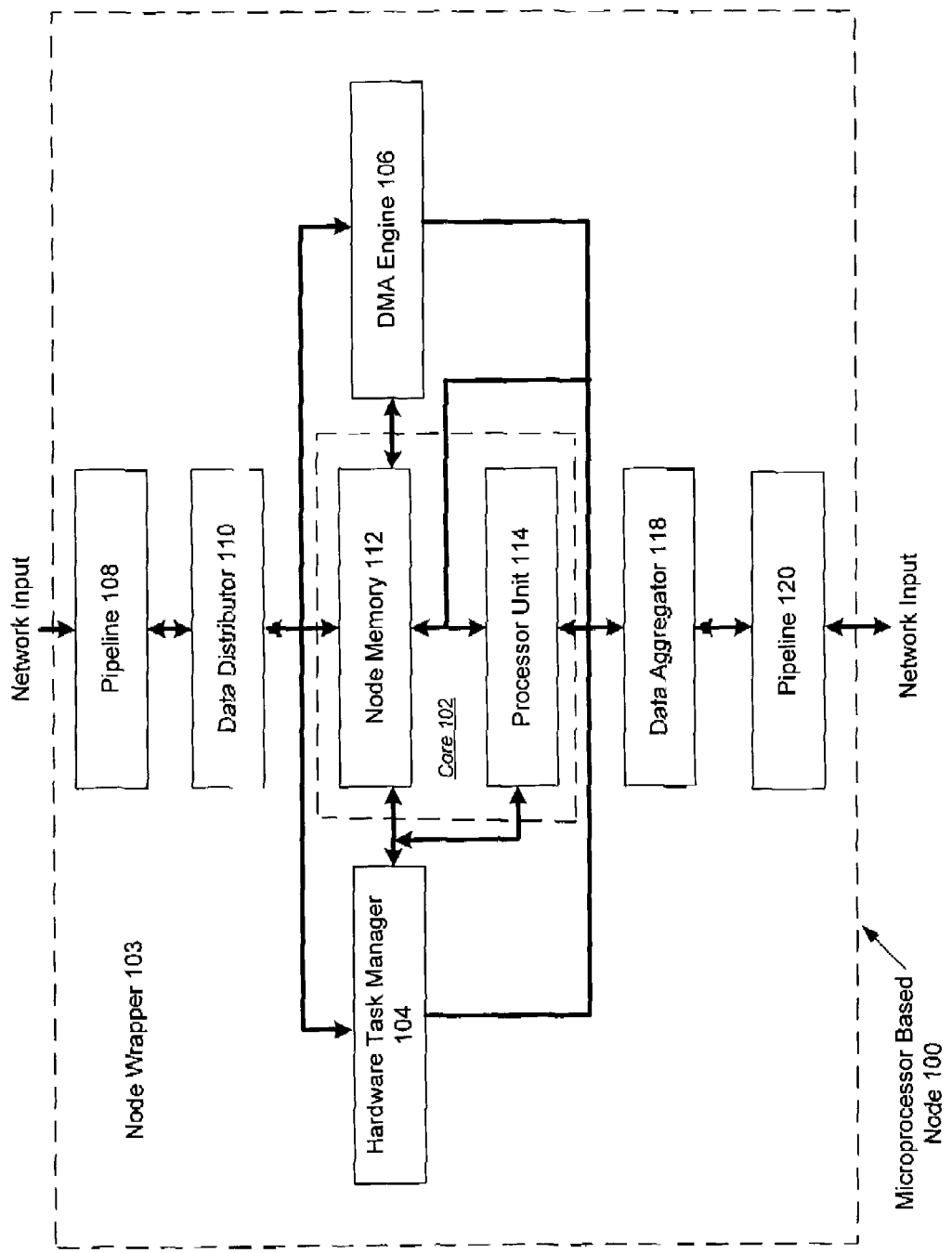
FIG. 1 is a block diagram of an exemplary programmable scalar node, or PSN, and node wrapper system interface in accordance with an embodiment of the present invention.

Referring now to the drawings more particularly by reference numbers, a block diagram of the nodal architecture of an exemplary microprocessor based node is shown in FIG. 1. MICROPROCESSOR BASED NODE 100 comprises an execution unit, or adaptive core 102, surrounded by a node wrapper 103. Adaptive core 102 includes memory and computational elements. More specifically, adaptive core 102 may comprise node memory 112 and processor unit 114. Sufficient node memory is provided for both instructions and data necessary to implement various algorithms. Processor unit 114 is preferably a general-purpose synthesizable RISC microprocessor.

Node wrapper 103 comprises data and configuration management elements. Data management elements include a hardware task manager 104, which configures adaptive core 102 to perform a desired function or implement a particular algorithm, and DMA Engine 106, which manages memory access and allocation tasks. Node wrapper 103 provides the resources necessary to support communications with other nodes. Each node, with the exception of the k-node, presents an identical interface to its node wrapper 103. When active signals passing between the k-node and its node wrapper are unused in other nodes, the signal may be tied to a constant voltage.

Microprocessor based node 100 further comprises network interface elements. Pipeline 108 receives data, configuration information and instructions from a network input and handles handshaking and timing requirements. In one embodiment, data, configuration information and instructions are combined or commingled in one continuous stream of information. This stream of information is then passed by pipeline 108 to data distributor 110.

Data distributor 110 passes configuration information to hardware task manager 104. Data distributor 110 parses the information stream and directs data and instructions to node memory 112 under control of DMA engine 106. DMA Engine 106 is used for transferring data from local memory to other nodes and memories residing on the MIN. DMA Engine 106 can be controlled by k-node poking into its own Node Wrapper.

DMA engine 106 further monitors the information stream to separate data from instructions. DMA engine 106 directs data and instructions to the necessary location in node memory 112. Once in memory, processor unit 114 executes instructions to perform the desired function using or modifying the data.

When the execution of the algorithm or function is concluded, data, instructions and/or configuration information are passed to data aggregator 118. Data aggregator 118 creates an output data stream to be passed to at least one other node. Pipeline 120 provides the handshake and control interface to the communication network that links the various nodes for data aggregator 118.

To illustrate the operation of microprocessor based node 100, a particular first configuration is set by hardware task manager 104 to perform a particular task or function. The configuration to execute a particular algorithm or function during or after a first period of time is received in a first stream of information either from the Internet or from a memory. Transmission of the first stream is typically, but not always initiate by a user request. Conceptually, the configuration process may be considered as a hardware equivalent of "calling" a subroutine in software to perform the algorithm. The data distributor is responsible for parsing the information stream to pass configuration information to the hardware task manager 104.

The first information stream further includes instructions for execution by processor unit 114 and data, which is to be stored in node memory 112. Data distributor 110 is responsible for placing instructions into memory. Once core 102 is configured as directed by configuration information, processor unit 114 executes the instructions to perform the selected algorithm or function using the data that was received in the stream of information. The node may then be adapted to perform a different selected algorithm or function during a second or subsequent time period or to operate the same algorithm or function on different data. The temporal nature of adaptable microprocessor based node 100 enables the node to efficiently adapt to the requirements of each algorithm or function. Thus, mobile or battery powered devices more efficiently use available hardware in terms of cost and silicon area, with improved performance and low power consumption compared to ASIC, FPGA or custom designed integrated circuits.

Figure 2:
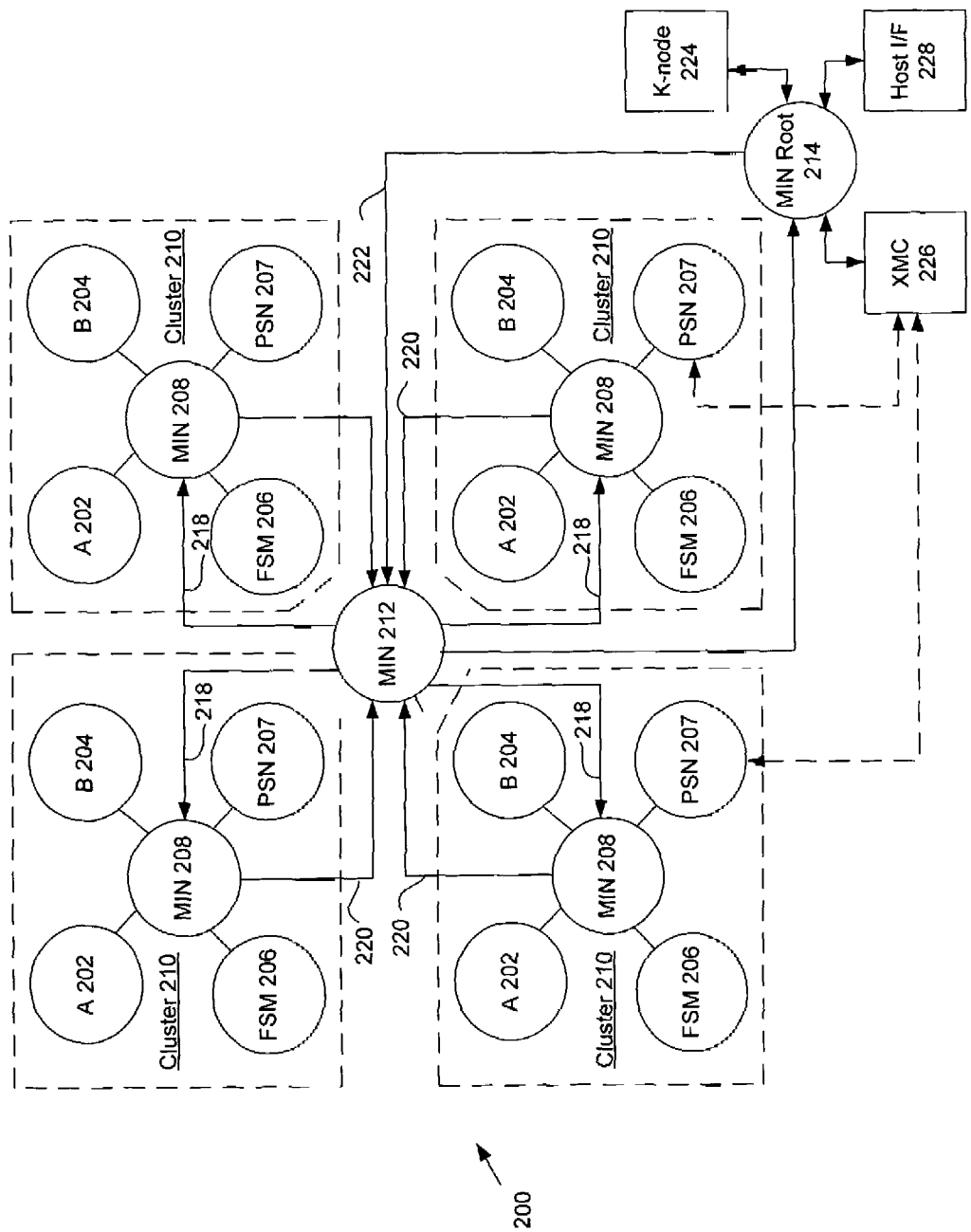
FIG. 2 is a block diagram a representative general architecture of the integrated circuit device having an adaptable computing engine in accordance with an embodiment of the present invention.

FIG. 2 illustrates the architecture of a portion of an adaptive computing engine (ACE) 200 that includes different node types to perform different functions. In one embodiment, ACE 200 includes a plurality of clusters 210 each of which includes an arithmetic node 202, a bit-manipulation node 204 and a finite state machine node 206 in addition to microprocessor based node 100. Each node is coupled to matrix interconnect network (MIN) 208, which in turn couples each cluster 210 to a second level matrix interconnect network 212. MIN 212 couples up to four clusters 210 to a third level MIN 214. The MIN communication structure is preferably a 51-bit wide bus to minimize the delay associated with transferring information or data from one node to another.

ACE 200 further includes a k-node 224 coupled to MIN 214, which is also referred to the root level. An external memory controller 226 and host interface 228 are also connected to MIN 214. The k-node 224 receives instructions and configuration data from an external source such as a system controller (not shown) through host interface 228 upon startup or initiation of operation and then proceeds to adapt the nodes in each cluster 210 in accordance with configuration information. External memory controller 226 is adapted to interface with external memory, which may be DRAM, SRAM, Flash or any other volatile or non-volatile random access memory. In one preferred embodiment, k-node 224 is based on or similar in architecture to microprocessor-based node 100 in that each includes a similar processor core 114. However, the k-node is adapted to execute operating system functions more efficiently. In another embodiment, the k-node is a PSN adapted to function as a k-node. Configuring the PSN is easily accomplished by setting a configuration register. When microprocessor based node 100 is configured as the k-node it executes boot code, operating system code and application code rather than algorithms to implement specific functions or features. Regardless of the embodiment implemented on the integrated circuit, only one k-node is on each integrated circuit.

Although engineering decisions may dictate otherwise, there may be one in each cluster 210 connected to each local branch of the MIN 208. Thus, each PSN has three peer nodes, with which it contends for communication resources. Cluster 210 in most cases resolves the contention of its nodes by means of a round-robin fairness algorithm. However, in the case of a packet-mode Point-to-Point (PTP) communications process, one sending node and one receiving node may be designated to have priority within each cluster. Then a sequence of arbiter circuits (not shown), in the path from the sending node up through the root MIN and back down to the receiving node, are locked for the duration of the packet-mode PTP communication process. The k-node has to authorize locking these arbiter circuits for each PTP communications process.

This matrix configuration may be extended to encompass a hierarchy of an arbitrary number of levels or tiers. Thus, although only four clusters are shown in FIG. 2, it is to be understood that any number of such clusters may be provided on an integrated circuit as the architecture is inherently scaleable.

Each node 202-206 and microprocessor based node and programmable scalar node 207 includes a number of computational elements and local memory surrounded by wrapper elements such as described in FIG. 1. Each node may be adapted on the fly to perform a desired function or to execute a specific algorithm.

To illustrate, an arithmetic node 202 can be adapted to implement variable width linear arithmetic functions such as a FIR filter, a Discrete Cosign Transform (DCT), a Fast Fourier Transform (FFT) and the like. A bit manipulation nodes 204 can be adapted to implement different width bit-manipulation functions, such as a linear feedback shift register (LRSR), Walsh code function generator, code generators or a TCP/IP packet discriminator, by way of example. Finite state machine (FSM) nodes 206 can implement any class of FSM. Microprocessor based node can be adapted to function as a programmable scalar node (PSN) 207 that can execute legacy code or code algorithms to implement new functions or features.

Figure 3:
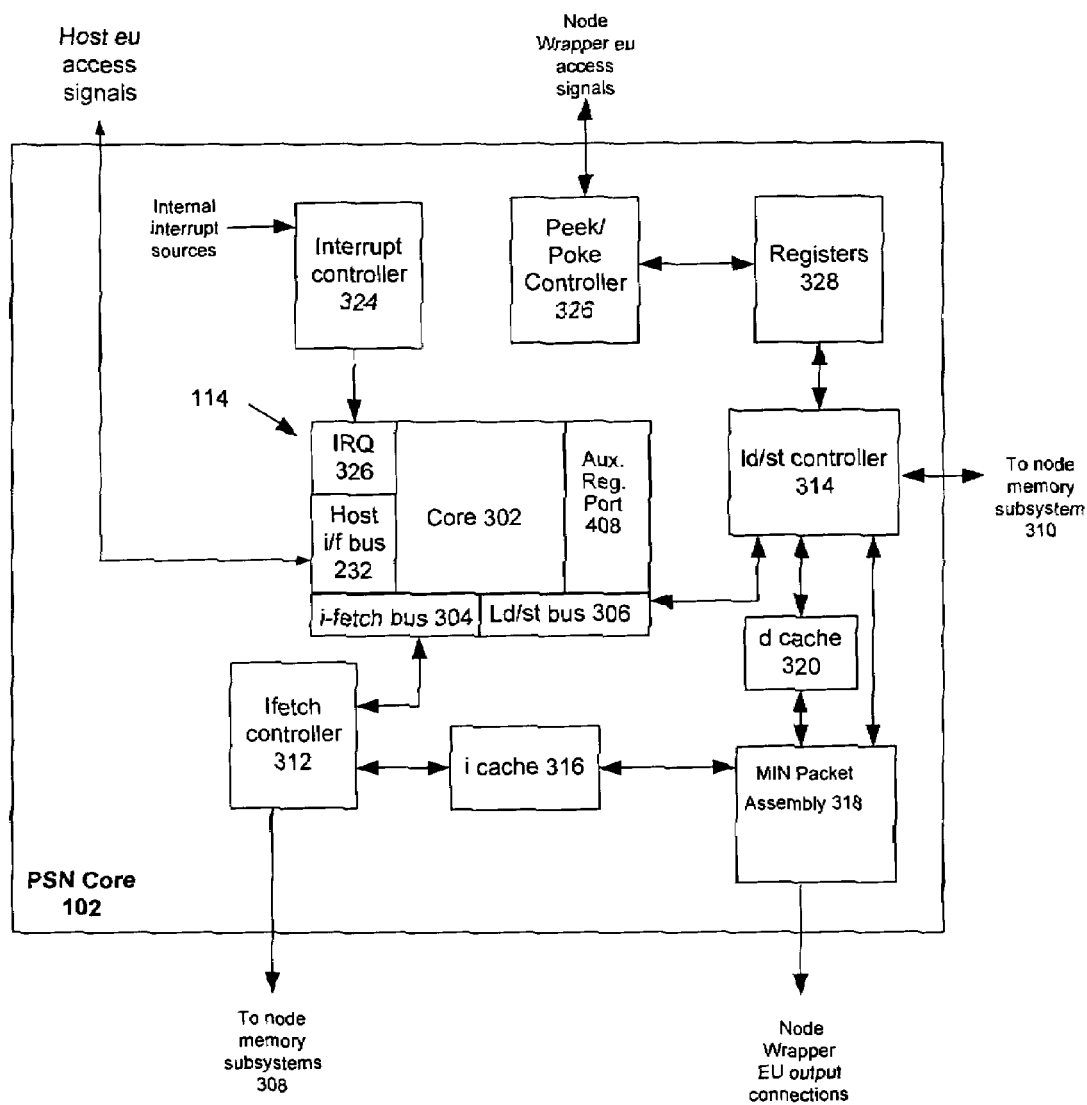
FIG. 3 is a block diagram of an exemplary PSN node in accordance with an embodiment of the present invention.

FIG. 3 shows in greater detail the architectural features of the adaptive core 102 of microprocessor based node 100 when adapted to function as a programmable scalar node (PSN). More specifically, processor unit 114 includes a processor core 302 that is coupled to node memory 112 by an instruction fetch bus 304 and load/store bus 306. Processor core 302 is preferably a 32-bit little-endian RISC processor that provides zero overhead loops, conditional branches and jumps. Processor unit 114 includes 32 general-purpose registers and a 32-bit instruction format, maskable and non-maskable interrupts and a host interface 322, sleep mode to improve power efficiency in quiescent operating conditions, and clock-gating options. In the preferred embodiment, processor core 302 is commercially available from ARC International.

Memory 112 comprises 16-Kbyte private node memory 112 that includes an instruction memory 308 for storing executable instructions and data memory 310 for storing data and other information. Processor unit 114 accesses instruction memory 308 over the I-fetch bus 304. I-fetch bus 304 can be extended to 26-bit width to provide addressing up to 64 MB of instructions. Processor unit 302 separately and independently accesses data memory 310 over the load/store bus 306. The load/store memory bus size can be extended to 32-bit width to provide addressing up to 4 GB of data. The Load/Store bus provides a delayed load with register scoreboard, buffered store, and address register writeback. Both memories 308 and 310 have independent read and write ports and are controlled by ifetch controller 312 and load/store controller 314, respectively.

Processor unit 114 accesses instruction memory 308 over the I-fetch bus 304. I-fetch bus 304 can be extended to 26-bit width to provide addressing up to 64 MB of instructions. Processor unit 302 separately and independently accesses data memory 310 over the load/store bus 306. The load/store memory bus size can be extended to 32-bit width to provide addressing up to 4 GB of data.

Processor unit 114 is designed with a four-stage pipeline and requires that all the instructions in the pipeline execute at different stages in the process to avoid stalling or flushing of the pipeline. The first stage of the pipeline fetches instructions. The second stage of the pipeline decodes the fetched instruction and fetches any operands. The third stage executes the operation specified by the instruction. The fourth stage writes the results back to core or internal registers or other memory.

When processor core 302 requires an instruction, ifetch controller 312 first looks to see if instructions are pending in an instruction cache 316 which is a high-speed memory that stores only those instructions that processor 302 may need in the immediate future. In one embodiment, instruction cache is a 1-Kbyte direct-mapped cache with a line size of 64 bytes, which equals sixteen instructions. Data width is 32 bits and address width is 26 bits.

Attempts to fetch instruction from memories other than the local node memory will be passed to controller 312. When a cache miss occurs, an entire cache line is fetched from the memory source. The refill of cache line that contained the missing instruction always starts from the beginning of the line. The processor is stalled only until the requested instruction within the cache line has been fetched and the missing instruction passed to the processor. The processor is then restarted while the rest of the cache line refill continues. When processor core 302 requires data, load/store controller 314 looks to see if data is present in data cache 320.

If the cache 316 does not contain the necessary instructions, controller 312 will transfer a group of instructions from external memory to cache 316. Controller 312 then transfers instructions to processor unit 114. Controller 312 initiates instruction transfer by authorizing MIN packet assembler 318 to transfer instructions into cache 316.

MIN packet assembler 318 handles node-to-node communication and handshaking requirements. Node-to-node communication includes messages, memory reads and writes as well as peeks and pokes to specific memory or register locations. When configured as a k-node, processor core 114 can generally peek and poke to all device memory and registers. However, when configured as a PSN, the processor core can only peek and poke into memory or registers within its own node wrapper, its execution unit, and its nodal memory.

Data cache 320 is a high-speed memory that stores data that has a high probability of being used by processor 302. In one preferred embodiment, it is a 1-Kbyte direct-mapped cache with a line size of 64 bytes, which is sixteen double-words and a writeback policy upon a cache miss. Data width is 32 bits and address width is 32 bits. Prior art predictive algorithms may be employed to determine the criteria for selecting and transferring data from external memory to cache 320. Controller 314 obtains data from outside of core 102 from MIN packet assembler 318, which interfaces with other nodes or circuits.

If memory transactions are targeted for other nodes, either controller 312 or controller 314 passes the memory transaction directly to MIN packet assembly 318. MIN packet assembly 318 assembles packets comprising the memory request to be sent to other memory controllers associated with other nodes sitting on the MIN. MIN packet assembly 318 takes all MIN traffic passed from each controller and packages them into MIN words for the data aggregator 118 in the node wrapper 103. MIN packet assembly 318 includes configuration parameters for each of the input and output buffers. These parameters are obtained from configuration registers in registers 328.

In operation, controllers 312 and 314 determine whether a memory request is a local memory access, an external memory access, or an input or output buffer access, from either ifetch or load/store buses. Controller 314 maps, if necessary, load/store memory access addresses to a base physical memory page on a per task basis. Nodes do not directly communicate with each other but rather use the node wrapper 103 to interface to the matrix interconnect network (MIN) which services all on-chip operating entities.

Microprocessor based node 100 further includes an interrupt controller 324 to handle interrupts from internal sources; peek/poke controller 326 to handle memory access from the node wrapper requesting to look or write at the execution units' registers 328 or registers 408. The peek/poke controller 326 and registers 328 provide the interface between the hardware task manager and processor core 302.

Figure 4:
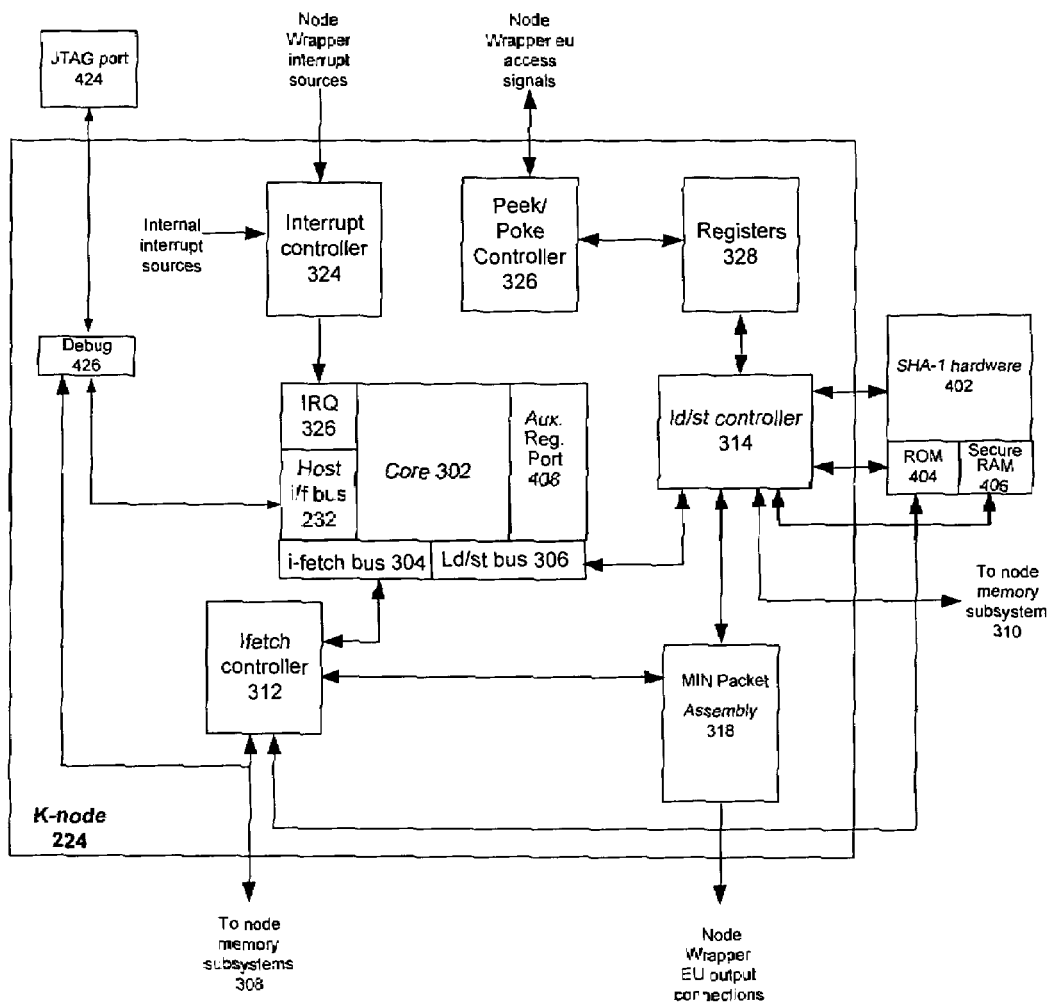
FIG. 4 is a block diagram of an exemplary k-node in accordance with an embodiment of the present invention.

In contrast to the PSN, k-node 224 comprises characteristics not present in a PSN as shown in FIG. 4. Specifically, k-node 224 includes security hardware 402 that supports a secure hash algorithm using a RSA algorithm. A 1024 bit digital signature is stored in an 8-Kbyte ROM 404 that also stores boot code and security code. The k-node also includes 2752 bytes of RAM 406. Because the k-node controls the entire integrated circuit, a JTAG access port 424 provides access to a debug port 426 supports access to the processor core and nodal memory to enable debug in the event the execution of processor core 114 results in an error condition.

Upon power on or a reset condition, the k-node boots from its own private 8-Kbyte ROM. A secure hash algorithm crypto-processor core, such as the SHA-1 processor, which is a commercially available from Cast, Inc. of Woodcliff Lake, N.J., is controlled through the load/store controller 314.

Although k-node 224 and microprocessor based node 100 share similar architecture, each has very different system functions. Accordingly, the memory maps for the k-node and the PSN differ even though they share certain common features. For example, both maps reserve addresses from 00000_0000 through 0x0000_3fff to address their private node SRAM, and addresses from 0x4000_0000 through 0x_7fff_ffff are reserved to address external data memories.

FIGS. 5A and 5B illustrates a representative example of a memory map as seen by a task running on a k-node 224 and a microprocessor based node 100, respectively. Instruction and data access requests are handled separately and independently. Instruction access presents the physical memory address, while data access may be translated and mapped to a physical address that corresponds to a logical address.

The nodal memory (308 and 310) is 16 Kbytes in size. Instruction fetches are done from the nodal memory at locations 0x0 through 0x3fff (FIG. 5A). Instruction fetches from nodal memory are single cycle accesses, except when a one cycle stall occurs due to a collision with a data load from the same memory block, or a one cycle stall occurs due to a node wrapper read caused by a peek to the same memory block. Instructions from nodal memory are not cached in the instruction cache for the k-node.

The reset vector is located in the Boot ROM. The processor boots with address 0x0000 that is mapped to boot ROM address (0x8000). The address 0x0004 is also mapped to address 0x8004. This means that the first instruction in the Boot Rom should be a "Jump" to location 0x8008 (boot code section). This prevents instruction fetches to continue from 0x0008 (nodal memory) automatically after 0x0004 (0x8004, Boot Rom).

The ROM 404 is from 0x8000-0xA000, is 8K bytes in size and has read only access. The boot code and the security code resides in the ROM from 0x8000. The secure RAM including the SHA-1 memory is from 0xC000-0xCABF and 2752 bytes in size.

Address range 0x1_8000-0x1_8fff is reserved for the memory-mapped registers within the K-node. Read and writes to these registers by loading and storing to address range—0x1_8000 through 0x1_8fff.

Load/stores are done from/to the nodal memory at locations 0x0 through 0x3fff. When a load collides with an instruction fetch to the same memory block, the load has priority over the instruction fetch to that same memory block.

All the interrupt vectors other that the reset vector are located in the nodal memory. The instruction fetches from location 0x0000 and 0x0004 are prohibited in the nodal memory. Those addresses are mapped to the Boot Rom (reset vector location).

FIG. 5B illustrates the nodal memory map for microprocessor based node 100. Specifically, the nodal memory is 16 Kbytes in size. Instruction fetches are done from the nodal memory at locations 0x0 through 0x1fff0x3fff. Instructions from nodal memory are not cached in the instruction cache.

Load/stores are done from/to the nodal memory at locations 0x0 through 0x1fff0x3fff. When a load collides with an instruction fetch to the same memory block, the load has priority.

Address range 0x1_8000-0x1_8fff is for the memory-mapped registers within the PSN Node. Executable code running on the PSN node performs read and writes operations to the registers in the address range—0x1_8000 through 0x1_8fff.

Figure 6:
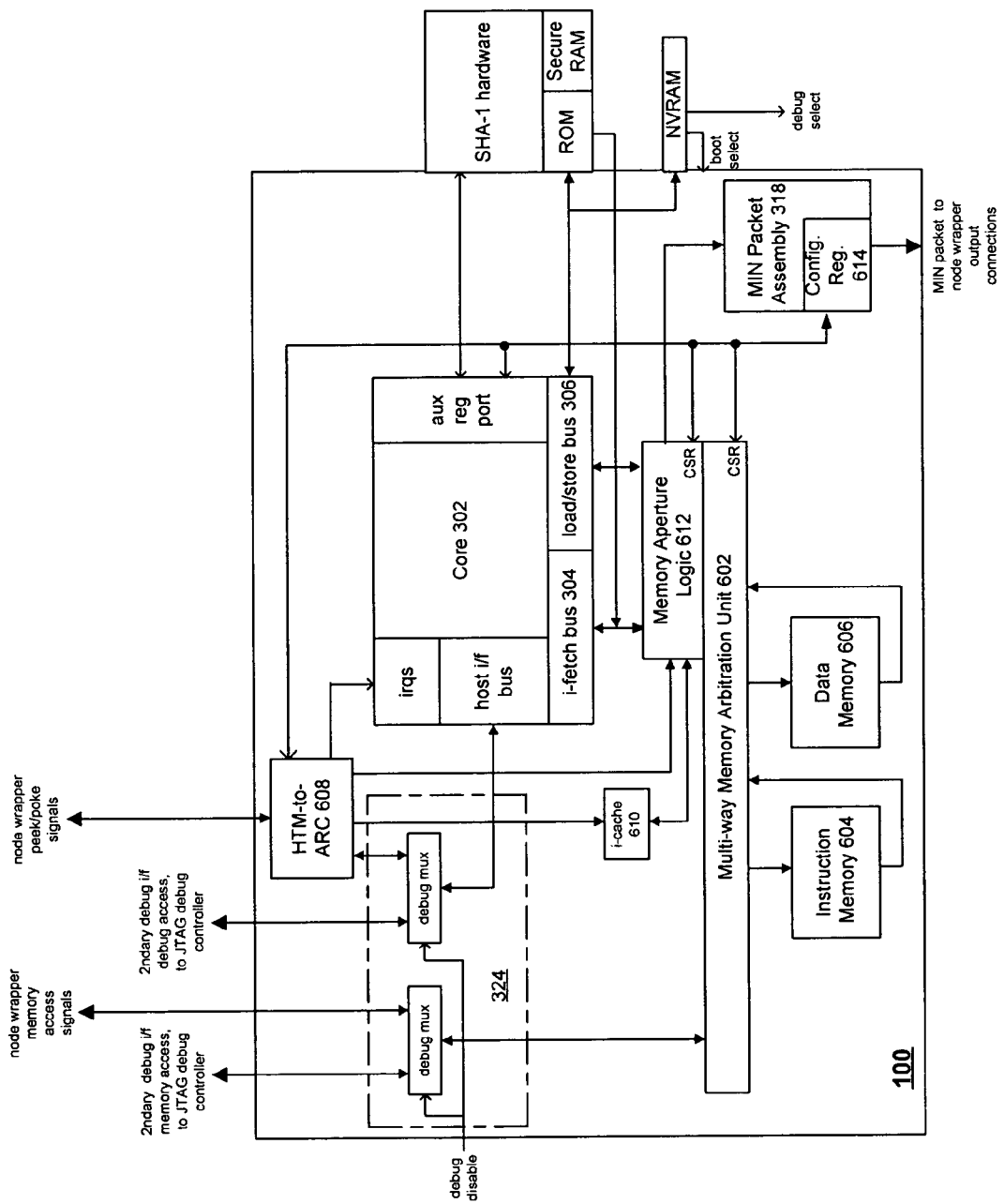
FIG. 6 is a block diagram of another embodiment of a PSN node that may be operated as either a k-node or a PSN node in accordance with an embodiment of the present invention.

Referring now to FIG. 6, an alternative embodiment of a microprocessor based node 100 is illustrated. The primary difference between the two embodiments resides in the configuration of the node as either a k-node or as a PSN and in memory access.

Configuration registers 614 contain the parameters for memory 606, which, if necessary, map a task's logical data memory access to physical addresses. Essentially, the mapping process establishes a protected memory page that bounds all load/store requests to a region of the physical memory. If a memory access is not within the task's allotted page size, the address wraps to the beginning of the physical memory access range allocated, thus a garbage read or an overwrite situation can occur in this case. In addition, if the memory access goes beyond the physical memory size, a memory exception is generated and the address bits held at the last address (at all ones).

The memory arbitration unit 602 has possible three memory clients to serve, i-fetch 304 and load/store 306, and a memory access from the node wrapper trying to access a nodal memory through HTM-to-ARC 608. Its main function is to arbitrate between processor unit 114 access and node wrapper access 103 to local node memory 112. Memory arbitration unit 602 grants and halts these memory client requests as necessary to maximize throughput. The memory arbitration unit 602 manages nodal memory sources including the local instruction and data memories 604 and 606, respectively. Memories 604 and 606 each have individual read and write ports.

If transaction were targeted at other nodes, these memory requests pass directly to the MIN packet assembly 318, which packetizes the memory request to send to other memory controllers sitting on the MIN.

Memory aperture logic (MAL) 612 determines whether a memory request is 1) local memory access, 2) external memory access (including bulk, external, a peek/poke accesses), or 3) input or output buffer access, from either the ifetch 304 or load/store 306 buses.

In the MAL 612 block, the configuration registers contain the Memory Access Scope (MAS) parameters for the memories, which, if necessary, could map task's data memory access to physical addresses depending the base address set and limited by the configured buffer size (power-of-2). Essentially, this establishes a protected memory page that bounds all load/store requests to a region of the physical memory.

If a memory access is not within the task's allotted page size, the address wraps to the beginning of the physical memory access range allocated, thus a garbage read or an overwrite situation can occur in this case. In addition, if the memory access goes beyond the physical memory size, i.e. in the case of bulk page base address 0x7c000 with bulk page size 128 kB for example, a memory exception will be generated and the address bits held at the last address (at all ones). Furthermore, if the k-node sets the MAS_LOCK register, programs running on the PSN cannot reconfigure these registers. This feature gives the k-node the ability to secure a memory page for a particular PSN so that all programs running on it can only access a given region of the physical memory.

When operating as a k-node, the PSN runs the operating system for the ACE. In the k-node, the PSN is used to adapt other nodes to perform a function in much the same way that a subroutine may be called in a software program to perform a particular function. Further, the k-node manages data flow between nodes.

In the k-node, register 614 is set so that programs running on the k-node cannot reconfigure node parameters. This feature enables the k-node to secure a memory page for a particular PSN so that all programs running on it can only access a given region of the physical memory.

In one embodiment, a node specific security configuration register 614 physically resides in MIN Packet Assembly 318. The security configuration register contains a security bit that determines whether PSN node is used as a k-node or as a PSN. When the security bit is set, MIN words sent out by the MIN Packet Assembly 318 include a full range of MIN service words. Thus, the security configuration register bit at address 0x1000 determines the security status of the PSN. If the bit is set to a logical one, the node is a k-node, otherwise the node is a PSN node.

In additional to bulk and external memory random accesses in PSN, the k-node posses the ability to peek and poke node registers and node memory spaces. However, all memory mapped accesses regardless of peek/poke or memory random access is done through ARC load and store instructions. The address appeared on the load/store bus is used to decoded what kind of MIN service to use for a given load or store request. If it is accessing the actual bulk or external memories, the memory random access MIN service will be used.

In the k-node, the embedded ROM and Secure RAM, two consecutive memory regions respectively, are connected to ARC local load/store bus, which bypasses all memory arbitration and are accessed directly. Both instruction and load/store access can read the content of the ROM through the same address range. The top 192 bytes of the ROM are occupied by the pico-codes needed to run the SHA-1 hardware. The top 256 bytes of Secure RAM are shared with SHA-1 hardware so both ARC and the SHA-1 have access to these regions of memory. However, neither the MIN nor the debug port can peek or poke directly to these two regions.

An internal nonvolatile memory (NVRAM) is directly connected to load/store bus 306 in order to bypass memory arbitration. Only a program running on the k-node can access the content of the NVRAM and neither the MIN nor the secondary debug port can access directly into this memory. The physical size of NVRAM is 84×1 in one embodiment, in which the security key resides in the least significant 80 bits. The top word in the NVRAM contains security parameters for debug disable, boot enable, and chip ID.

When Debug Disable is enabled, the secondary JTAG debug has access to k-node internal registers and memory. The JTAG debug and MIN accesses share the same connections into the ARC. Therefore, they are multiplexed, but a MIN access will always halt the JTAG access. When Debug Disable is asserted, the MIN access is the only gateway into k-node internal registers and memories. The secondary debug interface from the JTAG controller is meant for bring-up and initial debugging of codes on the k-node.

In the PSN, the ARC will stay in a reset state until cleared by a k-node command upon a system reset. The k-node loads the nodal memory with instructions for each PSN and then turns on the execution unit or core 102 of the PSN. When the k-node comes out of reset, it jumps to location 8000H and starts execution from the boot ROM. Thus, the k-node initiates its environment first and then begins the process of initiating operation of the PSN and other nodes comprising the system.

A chip level BOOT_SEL (not shown) will have a software window for the boot code running on the k-node through the following auxiliary register access. The initial boot loader residing on the internal ROM can read the state of this pin, and decide the location where the rest of the boot program resides, either present in the flash memory attached to the integrated circuit or housed in a host processor. For example, if the BOOT_SEL pin is tied low externally, this can indicate the presence of a flash memory connected to the external memory controller with the boot codes programmed in it. Thus, the initial boot loader can jump to the flash memory location and execute the rest of the boot sequence. On the other hand, if this pin is tied high externally, it indicates the absence of the flash memory. Thus, the initial boot loader waits for the host processor to give the k-node the start location of the rest of the boot codes.

Referring again to FIG. 3, where the node is configured as a general purpose RISC node, it is typically used for decision intensive applications requiring large code space. To illustrate, the PSN may be adapted to perform digital signal processing (DSP) functions at one point in time and then adapted to process digital photographic images. As used herein, RISC refers to a reduced instruction set computer.

MICROPROCESSOR BASED NODE 100 also includes timers, an interrupt controller and clock gating circuits. In one embodiment, timers include two 32-bit programmable timers that are by default initially disabled. Two timers are software controllable by application software programs and will generate interrupts as is well understood in the art.

When a memory read request goes off-node, additional timers prevent the system from hanging when an external memory read, external memory write or an on-chip peeks to any register or memory is attempted and an error occurs. The timer starts to count down as soon as a request is generated. When the timer times out, a memory exception is generated.

The interrupt controller is a two-level priority mask-able system that can accommodate up to nine interrupts. The interrupt system expects a vector table residing at a specific instruction address for all interrupts except the reset vector. The reset vector is hard coded to address 0x0 of an internal boot ROM in the k-node at address 0x8000.

Clock gating provides low power operation. More specifically, the clock tree driving processor unit 114 pipeline is automatically gated whenever operation is halted or the system is in the sleep mode. However, even in the sleep mode, configuration status registers and memories provide access to the host. In the sleep mode, the clock is gated only if all of following conditions are met:
1. The processor unit 114 is halted or is sleeping after the pipeline has been flushed;
2. A memory request is not being serviced;
3. The host is not accessing the processor unit 114;
4. There are no interrupt requests to service; and
5. All memory chip enable (or clock enable) signals are deactivated to power down the memories.

Figure 7:
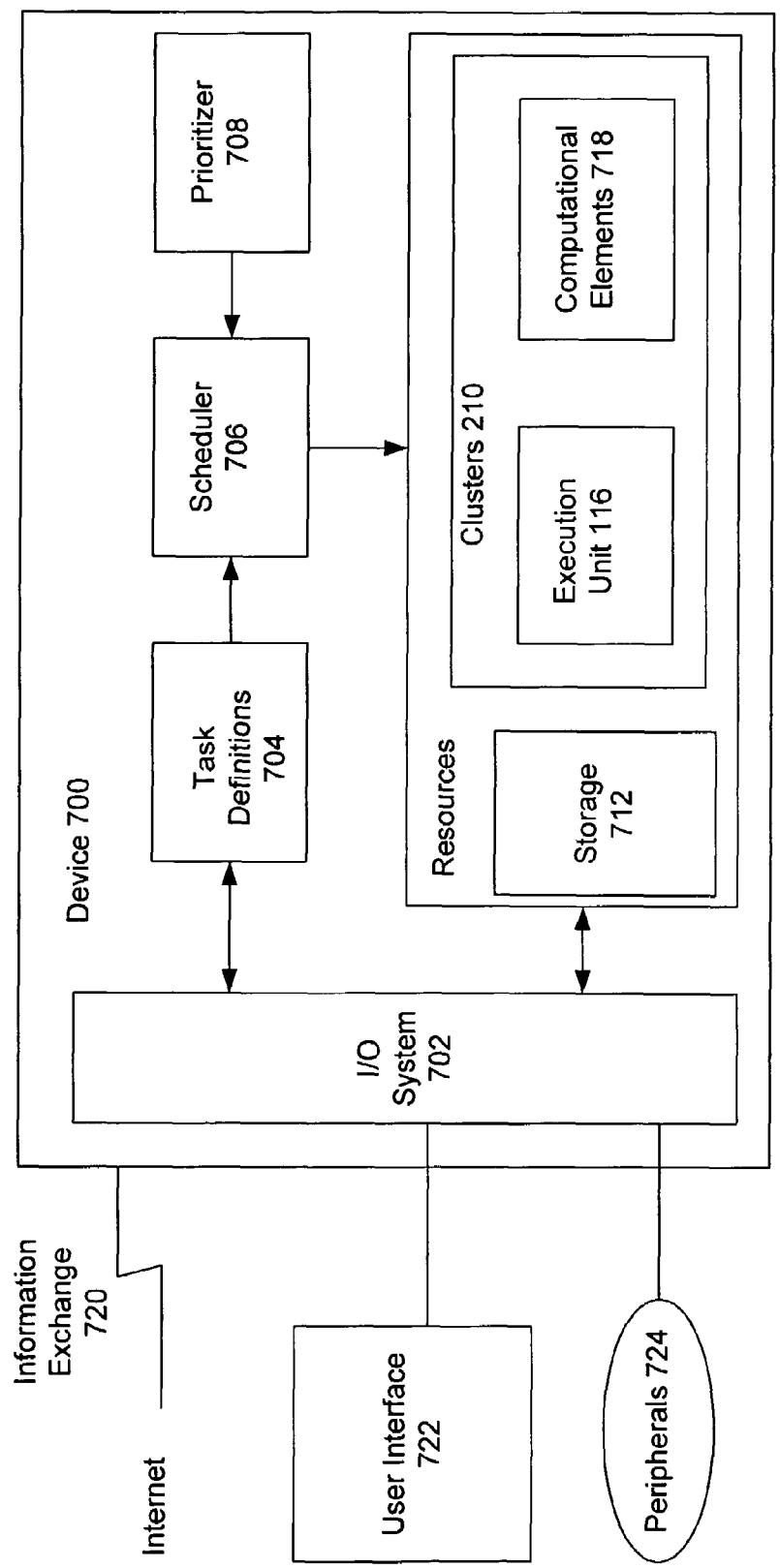
FIG. 7 is an illustration of a device that includes at least one adaptive computing engine in accordance with an embodiment of the present invention.

Refer now to FIG. 7, which illustrates a typical application of an embodiment of the invention. In FIG. 7, device 700 includes other devices, components, systems, subsystems, circuits, etc. For example, device 700 can be a consumer electronics device such as a cell phone, personal digital assistant (PDA), global positioning system (GPS) receiver, etc. In general, device 700 can be any type of device that can benefit from a processing engine.

Device 700 includes input/output (I/O) system 702 for providing data exchange with the external environment (illustrated at 720), connection to peripherals 724 and interaction with a human user via user interface 722. Data exchange includes exchanges with digital networks such as the Internet, local and campus intranets, communications infrastructures such as a telephone network, radio frequency exchanges as to wireless networks, etc. Any type of physical communication or data transfer network can be employed. Any type of protocol can be used to perform the communication.

User interface 722 allows a human user to operate the device, and to perform other functions. Typically, a user interface includes a display screen and manual controls such as buttons, a pointing device (e.g., a mouse, trackball, touchpad, etc.), knobs, switches and other types of controls. Additional output devices can include speakers, force feedback, etc. Peripherals 724 include storage devices such as disk drives, input/output devices such as keyboards, monitors, etc.

I/O system 702 can be in communication with different systems in device 700. For example, FIG. 7 shows I/O system 702 communicating with task definitions store 704 and storage and processing resources 710. Other arrangements are possible.

Task definitions store 704 is used to store programs, adaptation or configuration information, or other information used to control or manage the processing or functioning of device 700. In a preferred embodiment, adaptation information is used to define tasks that are executed by systems within device 700 to achieve functionality. For example, a task definition might allow device 700 to communicate using time-division multiplexed access (TDMA) with a cellular telephone network. Another task could provide a user with a phone directory including an interface for creating, modifying, organizing, searching, etc., the directory. Yet other tasks can implement a time-of-day clock, Internet web browsing, GPS position indicating, calculator, email interface, etc. Any type of functionality can be provided by a task definition. Combinations of functionality can be provided by one or more definitions. Further, a definition may provide only a portion of a feature, function or other process or functionality.

Scheduler 706 causes tasks, or portions of tasks, from task definition store 704 to be executed. Scheduler 706 can, optionally, use information provided by prioritizer 708 in determining how to specify the use of resources 710 to be used to execute a task. For example, scheduler 706 can assign all resources to a task that has been given high priority by prioritizer 708. Conversely, scheduler 706 may reduce resources allocated to a task, or suspend execution of a task, if the task has low priority.

Resources 710 include storage 712 and processing resources 714. Storage 712 can be, for example, system memory in the form of random-access memory (RAM) or other forms of storage. Storage can be distributed throughout the processing elements or it can be centralized. Processing resources 714 includes common types of processing resources such as general purpose processors, finite-state machines (FSMs), application-specific integrated circuits (ASICs), etc. A preferred embodiment of the invention relies on adaptive computing environment (ACE) 716 that includes multiple processing elements, or "nodes," also referred to as computational elements. Each node is of a specific type such as math, bit/logical, FSM or reduced-instruction set computing (RISC). Nodes are interconnected and may have associated resources, such as memory.

The temporal nature of the device 700 architecture should also be noted. At any given instant of time, utilizing different levels of interconnect, a particular configuration may exist within the ACE 716 that is optimized to perform a given function or implement a particular algorithm. At another instant in time, the configuration may be changed, to interconnect other computational elements or connect the same computational elements differently, for the performance of another function or algorithm.

Two important features arise from this temporal adaptablity. First, as algorithms may change over time to, for example, implement a new technology standard, the computational elements 718 may co-evolve and be reconfigured to implement the new algorithm. This temporal re-configurability of computational elements, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

It will be appreciated in view of the above description that the k-node may execute any suitable operating system, computer programs and/or application programs. As used herein, a "processor" may accept a program as input, prepare it for execution, and execute the process so defined with data to produce results. A processor may include an interpreter, a compiler and run-time system, or other mechanisms that fetch, decode and execute programmed instruction and maintain the status of results as the program is executed.

A "computer program" or an "application program" may be any suitable program or sequence of coded instructions that are to be inserted into a computer, well know to those skilled in the art.

Memory, unless otherwise noted, can be, by way of example only but not by limitation, an electronic, magnetic, optical, electromagnetic, infrared, or semiconductor system adapted to store or retain computer instructions or data.

Reference throughout the specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed. Thus, the scope of the invention is to be determined solely by the appended claims.

What is claimed is:

1. An integrated circuit comprising:
   a plurality of computational elements;
   a first and a second processing node each having a core processor with a common architecture, wherein the common architecture is configurable in response to a first configuration command to be a control node adapted to control an interconnection of said computational elements to perform a selected task and configurable in response to a second configuration command to be a programmable scalar node (PSN) adapted to perform a computational application;
   a first memory associated with said first processing node;

a second memory associated with said second processing node, each of said first and second memories including at least one of a data cache and an instruction cache of sufficient capacity to store instructions and data necessary to implement a plurality of algorithms;

a first interface coupling said core processor of said first processing node to said first memory and to said computational elements;

a second interface coupling said core processor of said second processing node to said second memory and to said computational elements, the first interface and the second interface having the same architecture; and a third processing node coupled to each of the first and second processing nodes and comprising a core processor with a common architecture, wherein the common architecture is configurable in response to a first configuration command to a control node adapted to control an interconnection of said computational elements to perform a selected task and configurable in response to a second configuration command to a programmable scalar node (PSN) adapted to perform a computational application and being configured to run boot code, operating system code and application code and further configured to adapt each of the first and second processing nodes to perform the computational application in response to the first and second configuration commands.

2. The integrated circuit of claim 1 further comprising means for temporally adapting said second node and said computational elements to perform a selected function.

3. The integrated circuit of claim 2 wherein said temporal means further comprises executable code defining said selected function stored in at least said first memory.

4. The integrated circuit of claim 3 wherein said executable code is downloaded from the Internet by said first processing node.

5. The integrated circuit of claim 4 wherein said executable code comprises operating system code.

6. The integrated circuit of claim 5 wherein said first processing node initiates the temporal adaptation of said computational elements and said second processing node to perform said selected function.

7. The integrated circuit it of claim 1 wherein said plurality of computational elements are adapted to form at least one arithmetic node, at least one of bit-manipulation node and at least one finite state machine nodes 8. The integrated circuit of claim 1 further comprising a plurality of said second processing nodes and an interconnection network, the plurality of said second processing nodes coupled through the interconnection network to said first processing node and plurality of computation elements.

9. The integrated circuit of claim 1, wherein the third node is configured to change the interconnecting of said computational elements and said first and second processing nodes to define a second task to achieve a second function previously not available or existent. bit for determining whether said first node functions as the controller node or as a RISC processor.

10. The integrated circuit of claim 1, wherein the third node controls access to each of the first and second memories so that each of the first and second processing nodes can access only a second memory page within the memory.

11. An integrated circuit comprising:
a first node having:
a first core processing configurable in response to a first configuration signal to a controller node for execution of operating system code;
a first memory for storing operating system executable code;
means for transferring operating system executable code and data from said first memory to said first core processor;
a plurality of computational elements adapted to perform a selected function;
a second node having:
a second core processor having the same circuit architecture as the first core processor, the second core processor configurable into a RISC processor for execution of application code;
a second memory for storing application code;
means for transferring application code and data from said second memory to said second core processor;
an interconnection network coupling said controller node and said RISC processor to said plurality of computational elements to perform the selected function;
a first interface coupling said first core processor to said interconnection network;
a second interface coupling said second core processor to said interconnection network, the first and second interfaces having a common interface architecture; and
a third processing node coupled to each of the first and second processing nodes and comprising a core processor with a common architecture, wherein the common architecture is configurable in response to a first configuration command to a control node adapted to control an interconnection of said computational elements to perform a selected task and configurable in response to a second configuration command to a programmable scalar node (PSN) adapted to perform a computational application and being configured to run boot code, operating system code and application code and further configured to adapt each of the first and second processing nodes to perform the computation application in response to the first and second configuration commands.

12. The integrated circuit of claim 11 wherein said first node further comprises a configuration register, said configuration register containing a bit for determining whether said first node functions as the controller node or as a RISC processor.

13. The integrated circuit of claim 11 wherein said configuration register bit, when set, protects a portion of memory from access by said computational elements.

14. The integrated circuit of claim 11 further comprising a protected portion of memory accessible only to said controller node.

15. The integrated circuit of claim 11 wherein said first node and said second node further comprise:
an interface comprising:
a data distributor for receiving an input stream from an external source, said input stream having configuration information, application code or executable code;
a hardware task manager for receiving configuration information from said data distributor;
a DMA engine for receiving data and executable code from said data distributor;
a controller for providing said interface access to a set of registers associated with the corresponding first or second core processor; and
an interrupt controller for detecting an interrupt condition.

16. The integrated circuit of claim 11, wherein the controller node is configured to change the interconnection network coupling said controller node to said computational elements to perform a second selected function previously not available or existent.

* * * * *

UNITED STATES PATENT AND TRADEMARK OFFICE
CERTIFICATE OF CORRECTION

PATENT NO.         : 7,502,915 B2
APPLICATION NO. : 10/673678
DATED                 : March 10, 2009
INVENTOR(S)       : Jacob et al.

It is certified that error appears in the above-identified patent and that said Letters Patent is hereby corrected as shown below:

In column 15, lines 55 to 56, please replace "or existent.  bit for determining whether said first node functions as the controller node or as a RISC processor." with
--or existent.--.

Signed and Sealed this

Twenty-sixth Day of May, 2009

JOHN DOLL
*Acting Director of the United States Patent and Trademark Office*